No. 643,801. Patented Feb. 20, 1900.
M. MARTIN.
ANTISEPTIC MOUTHPIECE.
(Application filed June 2, 1899.)

(No Model.)

Witnesses

Inventor
Morris Martin
By Wright, Brown & Quinby
Attorneys

UNITED STATES PATENT OFFICE.

MORRIS MARTIN, OF BOSTON, MASSACHUSETTS, ASSIGNOR TO THE HYGIENIC COMPANY, OF SAME PLACE.

ANTISEPTIC MOUTHPIECE.

SPECIFICATION forming part of Letters Patent No. 643,801, dated February 20, 1900.

Application filed June 2, 1899. Serial No. 719,113. (No model.)

*To all whom it may concern:*

Be it known that I, MORRIS MARTIN, of Boston, in the county of Suffolk and State of Massachusetts, have invented certain new and useful Improvements in Antiseptic Mouthpieces, &c., of which the following is a specification.

This invention relates chiefly to mouthpieces for telephones, phonographs, speaking-tubes, &c., and has for its object to provide an article of this class which shall present a durable and efficient antiseptic sound-conducting wall or passage adapted to destroy disease-germs and of a hard and rigid material capable of being wiped or washed and free from receptacles for the lodgment of such germs.

The invention also has for its object to provide an improved antiseptic composition adapted to be used for mouthpieces and for other purposes.

To these ends the invention consists in the improvements which I will now proceed to describe and claim.

Figure 1:
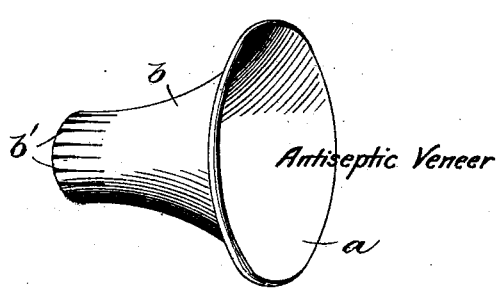
Figure 2:
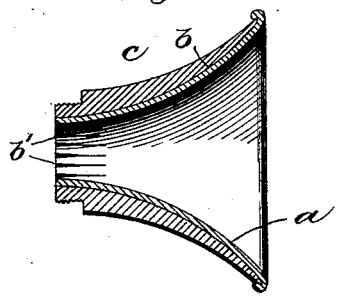
Figure 3:
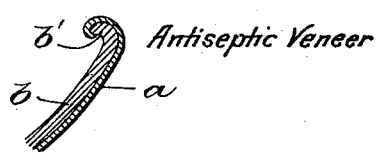
Figure 4:
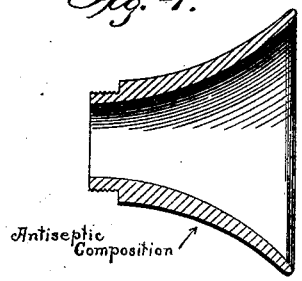

Of the accompanying drawings, forming a part of this specification, Figure 1 represents a perspective view of a mouthpiece embodying my invention and formed to serve as a lining for an ordinary mouthpiece. Fig. 2 represents a sectional view of the same applied as a lining to an ordinary mouthpiece. Fig. 3 represents an enlargement of a portion of Fig. 2. Fig. 4 represents a sectional view showing a mouthpiece made entirely of a rigid antiseptic composition.

The same letters of reference indicate the same parts in all the figures.

In carrying out my invention I make a composition containing a disinfectant and adapted to dry or set to rigidity from a plastic condition. For convenience I hereinafter call the said composition a "hard drying or setting" composition.

I prefer to make the composition from the ingredients and in the manner hereinafter specified. I take equal parts, by weight, of guncotton and ether and dissolve the guncotton in the ether, the result being collodion. I also take equal parts, by weight, of alpha-naphthol and alcohol and dissolve the alpha-naphthol in the alcohol. I then mix the two compounds, using by preference equal parts of each. This mixture or composition is in plastic or thick syrupy condition and has the following properties, namely: First, the alpha-naphthol contained in the composition is a powerful and effective disinfectant; secondly, the composition adheres firmly to brass and other metals and to various non-metallic materials; thirdly, it sets or hardens very quickly by the evaporation of the solvents contained in it and becomes rigid when set; fourthly, the solidified guncotton, while forming a rigid and apparently-dense body, is sufficiently porous to permit the gradual escape of the alpha-naphthol by evaporation, so that a sheet or layer of the hardened composition gradually diminishes when exposed to the atmosphere, the volatilized disinfectant being continuously given out so long as any of the disinfectant remains in the composition, and, fifthly, the composition is insoluble in water, and hence the surface of a mouthpiece made of the composition can be washed or wiped freely.

In Figs. 1, 2, and 3 I show a mouthpiece made in part of the rigid composition, the latter being disposed in the form of a facing or veneer $a$ on a metal shell or foundation $b$, formed to enter and fit an ordinary mouthpiece $c$. The composition is applied to the shell $b$ while in a plastic state and in setting adheres firmly thereto. The facing may be renewed from time to time by applying a fresh coating of the plastic composition. The smaller end of the shell is cut to form tongues $b'$, which are bent slightly outward and when inserted in the mouthpiece $c$ exert a sufficient frictional hold thereon to prevent the shell from dropping out of the mouthpiece $c$. The larger end of the shell is preferably bent backwardly to form a flange $b'$, bearing on the margin of the mouthpiece $c$.

In Fig. 4 I show a complete mouthpiece made of the said composition and adapted to be used as a substitute for the mouthpiece $c$.

I do not limit myself to the particular proportions above specified, as the same may be varied without departing from the spirit of my invention.

The composition may be used as a coating for earpieces used in connection with phonographs and other apparatus. It may also be used as a lining for surgical-instrument cases and for various other purposes.

I claim—

1. An antiseptic mouthpiece made wholly or in part of a moisture-proof composition which sets rigidly from a plastic condition, and contains a disinfectant.

2. An antiseptic mouthpiece made wholly or in part of a hard drying or setting moisture-proof composition containing a disinfectant and a holder therefor such as solidified guncotton.

3. An antiseptic mouthpiece made wholly or in part of a hard drying or setting moisture-proof composition containing alpha-naphthol.

4. An antiseptic mouthpiece made wholly or in part of a hard drying or setting composition containing alpha-naphthol and guncotton.

5. A mouthpiece comprising a strengthening shell or foundation, and an antiseptic facing composed of a hard drying or setting moisture-proof composition containing a disinfectant.

6. A mouthpiece comprising a strengthening shell or foundation and an antiseptic facing composed of a hard drying or setting moisture-proof composition which adheres firmly to the foundation and contains a disinfectant.

7. A mouthpiece comprising a strengthening-shell formed to fit the interior of an ordinary mouthpiece and having means for detachable engagement with the latter, and an antiseptic lining composed of a hard drying or setting moisture-proof composition which adheres firmly to the shell and contains a disinfectant.

8. A mouthpiece comprising a flaring metal shell divided at its smaller ends to form tongues adapted to maintain a frictional hold on an ordinary mouthpiece and provided with an antiseptic lining composed of a hard drying or setting moisture-proof composition which adheres firmly to the shell and contains a disinfectant.

9. The hereinbefore-described hard drying or setting antiseptic composition made by the drying or setting of a mixture of guncotton, ether, alpha-naphthol, and alcohol.

In testimony whereof I have affixed my signature in presence of two witnesses.

MORRIS MARTIN.

Witnesses:
  C. F. BROWN,
  C. L. COHN.